Patented May 2, 1933

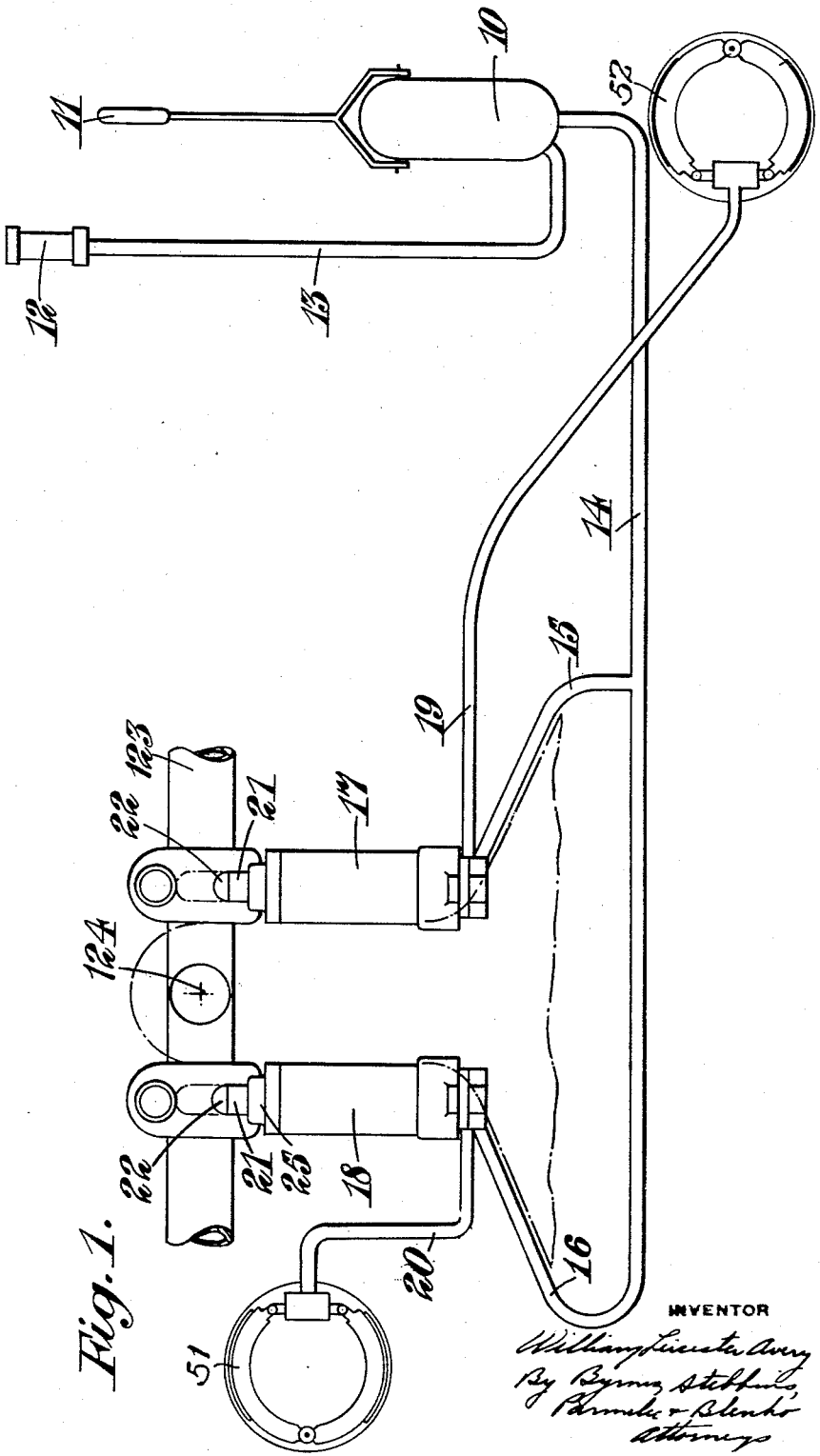

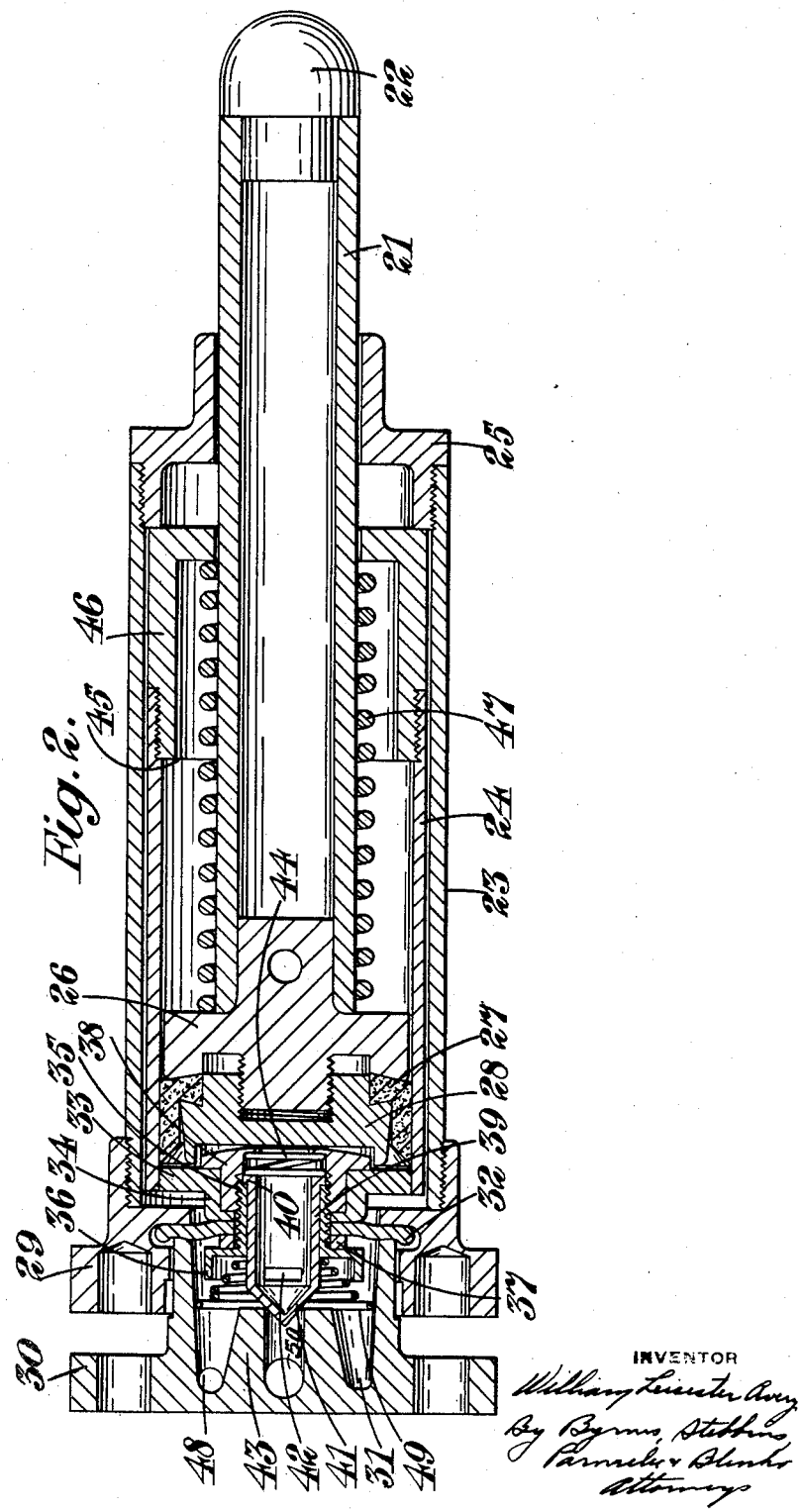

1,906,242

UNITED STATES PATENT OFFICE

WILLIAM LEICESTER AVERY, OF SILVERTOWN, LONDON, ENGLAND, ASSIGNOR TO THE INDIA RUBBER, GUTTA PERCHA AND TELEGRAPH WORKS COMPANY LIMITED, OF LONDON, ENGLAND, A BRITISH COMPANY

CONTROLS FOR FLUID PRESSURE OPERATED AIRCRAFT WHEEL BRAKES

Application filed September 18, 1931, Serial No. 563,487, and in Great Britain October 8, 1930.

This invention comprises improvements in or relating to controls for fluid-pressure operated aircraft wheel-brakes and relates to control systems for such brakes which comprise a main pressure-supplying apparatus which is operable by the aircraft pilot and which communicates with brakes on both sides of the centre line of the aircraft and a pair of auxiliary pressure-supplying devices one of which communicates with a brake or brakes of the wheel or wheels on one side of the centre line of the aircraft and the other with a brake or brakes on the other side of the said centre line, the said auxiliary pressure-supplying devices being mounted in the aircraft so that each may be individually operated.

The actuation of the main pressure-supplying device causes substantially equal increase of pressure in all the brakes connected to the system, while individual actuation of either of the auxiliary pressure-supplying devices causes increase of pressure only in the brake or brakes connected to the device in question and enables the aircraft to be steered when on the ground. Conveniently, the auxiliary devices may be associated with the rudder-bar of the aircraft in such manner that the rocking of the said bar in one direction actuates one of the auxiliary devices and rocking the said bar in the other direction actuates the other of the said devices.

One application of the invention is to control systems such as described where the main pressure-supplying apparatus and the auxiliary pressure-supplying devices each comprises a chamber to contain or receive fluid and means whereby the volume of the chamber may be reduced from its maximum to expel fluid under pressure from the chamber, the reduction in the volume of the chamber being effected by relative movement between two members of the apparatus or device (e. g. a cylinder and a piston).

The invention is, however, also applicable to servo-operated brakes in which case the main and auxiliary pressure-supplying devices serve to control fluid-pressure derived either from the same or different sources.

Heretofore, in order to prevent, upon actuation of an auxiliary device, fluid under pressure flowing from the said device to the other auxiliary device via the main pressure-supplying apparatus (thereby balancing the pressures and rendering the auxiliary devices ineffective for steering purposes) the main pressure-supplying apparatus has comprised a pair of separate chambers of reducible volume as above described one of which is connected to one auxiliary device and the other to the other auxiliary device, the said chambers having their volumes simultaneously and equally reduced by the movement of a single operating member.

According to the present invention a braking system of the type specified is characterized by means for closing the conduit leading from the main pressure supplying means to a brake when pressure fluid is being supplied to the brake from the auxiliary pressure supplying means.

According to one form of the invention, in a braking system of the type specified, an auxiliary pressure supplying device comprises a pressure fluid chamber, a pressure fluid conduit opening out of said chamber for connection to a brake, a pressure fluid conduit opening out of said chamber for connection to the main pressure supplying device and a valve in the latter conduit serving to prevent passage of fluid from the pressure chamber to the main device when the auxiliary pressure supplying device is being operated but allowing such passage of fluid when said device is released. Thus the invention provides an auxiliary pressure supplying device upon actuation of which fluid under pressure does not flow to the main pressure supplying apparatus, thereby rendering it possible for the main pressure supplying apparatus to comprise a single chamber which is connected to the auxiliary devices.

The valve may be operatively connected to a moving member of the auxiliary device to be positively opened thereby when the latter is in its fully retracted position.

The apparatus may comprise a non-return valve situated in the conduit between the pressure chamber and the main device whereby the valve or valves permit flow from the main pressure chamber to the auxiliary pressure chamber at all times and a reverse flow only when the auxiliary pressure applying means is released. A single valve may perform both functions in that it acts as a non-return valve which can be opened by fluid flowing from the main device to the brakes and that it is opened to permit the reverse flow when the auxiliary device is released.

Preferably the operative connection between the valve and the auxiliary operating member is such that the valve will remain open whatever the position of the operating member provided the latter is substantially free from pressure. The operating member may be moved to its retracted position by pressure from the main pressure applying device and is normally urged to the opposite or advanced position.

In order that the invention may be more readily understood, a specific example thereof will now be described with reference to the accompanying drawings, in which—

Figure 1 is a diagrammatic general elevation of a brake system operated by the rudder bar of an aircraft, and Figure 2 is a longitudinal section of the intermediate pressure supplying device.

Like reference numerals indicate like parts in both figures.

Figure 1 shows diagrammatically a main pressure supplying device 10 operated by a hand lever 11. The pressure fluid is oil and is derived from a reservoir 12 through a pipe 13. Operation of the hand lever 11 forces oil from the device 10 through a pipe 14 which branches into pipes 15 and 16 leading to the two auxiliary pressure supplying devices 17 and 18 respectively. When the latter are released, the oil can flow freely through them into pipes 19 and 20 respectively communicating with the brakes 51 and 52 on the right and left respectively of the aircraft. The auxiliary pressure supplying devices 17 and 18 are provided with plungers 21 (shown in Figure 2), the ends 22 of which bear against the members fixed to the rudder bar 123 on opposite sides of its pivotal axis indicated by the reference 124. Thus, as the rudder bar is swung about its pivot in one direction, one plunger will be pushed in to apply extra braking on one side, and when it is swung in the opposite direction, the other plunger will be pushed in to apply extra braking on the other side.

Figure 2 shows the construction of the auxiliary pressure device which comprises an outer cylinder 23 within which is an inner cylinder 24 whose outer diameter is slightly smaller than the inner diameter of the other cylinder. Extending through a cap 25 which is screwed to one end of the outer cylinder is a piston rod 21, one end of which extends within the inner cylinder and is enlarged at its extremity to form a piston 26 which is slidable within the inner cylinder. The piston has a forwardly extending cup washer 27 which is secured in place by a screwed on cap 28.

The end of the outer cylinder opposite to that through which the piston rod extends has an end cap of substantial size in two parts 29 and 30 in which is a cylindrical valve chamber 31 of smaller internal diameter than that of the inner cylinder. Between the said chamber and the interior of the outer cylinder is an annular diaphragm 32, the outer periphery of which is gripped between the two parts 29 and 30 of the end cap. The inner cylinder has a small lengthwise movement in the outer cylinder and at its end which is adjacent the aforesaid diaphragm has an end wall 33 having a central circular opening the edge 34 of which projects to the diaphragm 32 to which it is clamped by means of a threaded sleeve 35 having a flange 36, a washer 37 and a nut 38. Within the sleeve 35 slides a lantern valve 39 having a flange 40 at one end to prevent it passing through the sleeve towards the valve chamber, a conical end 41 at the opposite end and apertures 42 in its wall near that end. The valve chamber has in it an annular boss 43 projecting into it from its end wall and forms a seating to co-operate with the conical end 41 of the valve. A spring 44 serves to urge the valve towards its seating such motion being limited by the flange 40 of the valve.

The interior of the annular boss 43 leads into a lateral passage 50 which in use communicates through the pipe 15 and 16 with the main pressure supplying device.

Projecting inwardly from the interior of the inner cylinder behind the piston are a series of stops 45 carried by a screwed cap 46 which are engaged by the piston just before it reaches its most retracted position away from the valve chamber end of the device, in such manner that when the piston is in its fully retracted position the inner cylinder is in such position that the valve head is away from its seating and fluid can flow therethrough into the valve chamber and through the diaphragm centre into the inner cylinder.

Between the head of the piston and the stops 45 is a comparatively light compression spring 47 which normally urges the piston towards the valve chamber end of the device.

Within the valve chamber and extending between the flange 36 and the boss 43 (and thus surrounding the valve) is a light compression spring 49 which normally urges the inner cylinder away from the valve chamber thus normally tending to keep the valve off its seating.

The valve chamber has a further orifice 48 which freely communicates through the pipe 19 or 20 with the brake of the wheel which the device is arranged to operate.

It will be seen that the piston is normally at the valve chamber end of the inner cylinder (and thus the fluid capacity of the device is at the minimum) and the valve open.

In use the two auxiliary pressure devices are located in the aircraft in such position behind the rudder bar of the aircraft that when the pistons are thrust rearwards the ends of the piston rods come close up to the rudder bar so that movement of the bar to one side of its pivot will thrust the piston of one device forwardly in the device and movement of the bar to the other side of its pivot will thrust the piston of the other device forwardly therein.

The valves 41 are normally held in the open position by the springs 49. Upon actuation of the main pressure supplying apparatus fluid under pressure will flow into the auxiliary devices and therethrough to the brakes connected thereto, the pressure thrusting the piston rearwardly against the comparatively light springs 47 behind the pistons. As long as the pistons are in this position the valves cannot shut as the inner cylinders are firmly held away from the valve chamber ends of the outer cylinders by the pistons, and, as the pressure is reduced, by the springs 49. In this way the normal actuation and release of both brakes simultaneously is not interfered with by the valves in the auxiliary devices. When however it is desired to use the brakes for steering purposes, the main pressure supplying apparatus is applied to a sufficient extent to thrust the pistons in the auxiliary devices rearwardly and bring the ends of the piston rods into close proximity to the rudder bar. Upon the rudder bar then being rocked in one direction about its pivot the piston of the auxiliary device on that side of the rudder bar is thrust forwardly in the device. This increases the fluid pressure in the device and at the same time releases the inner cylinder. Owing to the fact that the total pressure upon the piston side of the diaphragm is greater than that on the other (due to the diameter of the valve chamber being smaller than the diameter of the inner cylinder) the diaphragm will be deflected towards the valve chamber against the light spring which urges it in the opposite direction. This deflection of the diaphragm will bring the inner cylinder against the valve chamber end of the outer cylinder and the valve on to its seating over the orifice communicating with the main pressure cylinder. This will prevent flow of pressure fluid back to the main pressure supplying apparatus and therethrough to the other auxiliary device, all the pressure set up by actuation of the auxiliary device flowing through orifices 42 and 48 to the brake with which it is connected, thereby applying this brake in excess of the other and producing a change in direction of the aircraft. When the rudder bar is brought back to its central position again the pressure will return the piston rearwards, taking with it the inner cylinder and lifting the valve from its seating.

In some cases it may not be desirable to include the spring behind the piston, the piston normally remaining in its rearward position.

Where the devices are operated by the rudder bar of the aircraft, the described arrangement is preferred as the bar can only come into contact with the devices after a partial actuation of the main pressure apparatus, leaving the rudder bar unhampered for its normal use.

I claim:—

1. A fluid-pressure braking system having in combination a plurality of fluid-pressure brakes, a main pressure device, conduits connecting it with the brakes, individually operable auxiliary pressure devices for said brakes and means operable on actuation of an auxiliary device to close the conduit leading from the main pressure device to the brake associated with that auxiliary device.

2. A fluid-pressure braking system having in combination a plurality of fluid-pressure brakes, a main pressure device, and individually operable auxiliary pressure devices for said brakes, each such pressure device comprising a pressure-fluid chamber, a conduit connecting said chamber with a brake, a conduit connecting said chamber with the main pressure device and a non-return valve in said latter conduit permitting flow of pressure fluid from the main pressure device to the auxiliary pressure chamber at all times and a reverse flow only when the auxiliary pressure device is released.

3. A fluid-pressure braking system having in combination a plurality of fluid-pressure brakes, a main pressure device, and individually operable auxiliary pressure devices for said brakes, each such auxiliary device comprising a pressure fluid chamber, a conduit connecting said chamber with a brake, a conduit connecting said chamber with the main pressure device and a non-return valve controlling said latter conduit and permitting flow at all times from the main pressure chamber to the auxiliary pressure chamber, an operating member for the auxiliary device, and lost-motion means connecting the latter with the valve so as positively to open the latter when the operating member is in its released position.

4. A fluid-pressure braking system having in combination a plurality of fluid-pressure brakes, a main pressure device, and individually operable auxiliary pressure devices for said brakes, each such auxiliary device comprising a pressure-fluid chamber, a conduit connecting said chamber with a brake, a conduit connecting said chamber with the main pressure device and a non-return valve controlling said latter conduit and permitting flow at all times from the main pressure chamber to the auxiliary pressure chamber, an operating member for the auxiliary device and lost-motion means connecting the latter with the valve and such as positively to open the latter when the operating member is in its released position but nevertheless to permit the valve to remain open irrespective of the position of the operating member provided that the latter is substantially free from actuating pressure.

5. A fluid-pressure braking system having in combination a plurality of fluid-pressure brakes, a main pressure device, and individually operable auxiliary pressure devices for said brakes, each such auxiliary device comprising a pressure-fluid chamber, a conduit connecting said chamber with a brake, a conduit connecting said chamber with the main pressure device and a non-return valve controlling said latter conduit and permitting flow at all times from the main pressure chamber to the auxiliary pressure chamber, an operating member for the auxiliary device, and lost-motion means connecting the operating member with the valve so as positively to open the latter when the operating member is in its released position, and means to lead pressure fluid from the main pressure device against the operating member to move it to its retracted position.

6. A fluid-pressure braking system having in combination a plurality of fluid-pressure brakes, a main pressure device, and individually operable auxiliary pressure devices for said brakes each such auxiliary device comprising a relatively fixed compartment containing a valve seating, a conduit connecting said compartment through the valve seating with the main pressure device, a piston member movable in said compartment and having a cylindrical extension in communication with the compartment, a valve carried by said piston member and co-operating with said valve seating, an operating piston movable in said cylindrical extension and another conduit connecting said compartment with an associated brake.

7. A fluid-pressure braking system having in combination a plurality of fluid-pressure brakes, a main pressure device, and individually operable auxiliary pressure devices for said brakes each such auxiliary device comprising a relatively fixed compartment, containing a valve seating, a conduit connecting said compartment through the valve seating with the main pressure device, a piston member movable in said compartment and having a cylindrical extension in communication with the compartment, a non-return valve carried by said piston member and co-operating with said valve seating, an operating piston movable in said cylindrical extension and another conduit connecting said compartment with an associated brake.

8. A fluid-pressure braking system having in combination a plurality of fluid-pressure brakes, a main pressure device, and individually operable auxiliary pressure devices for said brakes each such auxiliary device comprising a relatively fixed compartment containing a valve seating, a conduit connecting said compartment through the valve seating with the main pressure device, a piston member movable in said compartment and having a cylindrical extension in communication with the compartment, a valve carried by said piston member and co-operating with the said valve seating, an operating piston movable in said cylindrical extension, another conduit connecting said compartment with an associated brake, and a lost-motion connection between said valve and said operating member whereby the valve is opened when the operating member is in its retracted position.

9. A fluid-pressure braking system having in combination a plurality of fluid-pressure brakes, a main pressure device, and individually operable auxiliary pressure devices for said brakes each such auxiliary device comprising a relatively fixed compartment containing a valve seating, a conduit connecting said compartment through the valve seating with the main pressure device, a piston member movable in said compartment and having a cylindrical extension in communication with the compartment, a valve carried by said piston member and co-operating with the said valve seating, an operating piston movable in said cylindrical extension, another conduit connecting said compartment with an associated brake, and a lost-motion connection between said valve and said operating member whereby the valve is opened when the operating member is in its retracted position, the diameter of the piston carrying the valve being of different area from that of the operating piston.

10. A fluid-pressure braking system having in combination a plurality of fluid-pressure brakes, a main pressure device, and individually operable auxiliary pressure devices for said brakes each such auxiliary device comprising a relatively fixed compartment containing a valve seating, a conduit connecting said compartment through the valve seating with the main pressure device, a piston member movable in the said compartment and having a cylindrical extension, an aperture in the head of said piston to afford communication between the compartment and the cylindrical extension, a hollow valve slidingly received in said aperture and co-operating with the valve seating, an aperture in the wall of the valve, an operating piston in the cylindrical extension whereby fluid can be expelled through the aperture in the valve into said compartment and the valve can be pressed on to its seating, and another conduit connecting the compartment with a brake whereby when the valve is seated pressure fluid can be forced by the piston to the brake.

11. A fluid-pressure braking system comprising in combination a plurality of fluid-pressure brakes, a main pressure device, and individually operable auxiliary pressure devices for said brakes each such auxiliary device comprising a valve chamber having in it a valve seating, a conduit from the main pressure device leading to the valve seating, a flexible diaphragm opposed to and spaced from the valve seating and having its outer margin in sealed engagement with the wall of the valve chamber, a cylinder extending from and secured to the diaphragm on the opposite side thereof from the valve seating, registering apertures in the head of the cylinder and in the diaphragm, a valve guided in said apertures to co-operate with the seating, an operating piston in said cylinder, and another conduit connecting the said valve chamber with a brake and entering the valve chamber outside the valve seating.

12. A fluid-pressure braking system having in combination a plurality of fluid-pressure brakes, a main pressure device, and individually operable auxiliary pressure devices for said brakes, each such auxiliary device comprising a valve chamber having in it a seating, a valve co-operating with said seating, a conduit connecting the main pressure device with said seating, a flexible diaphragm opposed to and spaced from said seating and having its outer margin in sealed engagement with the wall of the valve chamber, a cylinder which is movable towards and away from the valve seating and is secured to and movable with the diaphragm, registering apertures in the end wall of the cylinder and in the diaphragm, an operating piston within said cylinder and another conduit leading from the valve chamber at a position beyond the valve seating and communicating with a brake.

13. A fluid-pressure braking system having in combination a plurality of fluid-pressure brakes, a main pressure device, and individually operable auxiliary pressure devices for said brakes, each such auxiliary device comprising a valve chamber having in it a seating, a conduit connecting the main pressure device with said seating, a valve co-operating with said seating, a flexible diaphragm opposed to and spaced from said seating and having its outer margin in sealed engagement with the wall of the valve chamber, a cylinder which is movable towards and away from the valve seating and is secured to and movable with the diaphragm, registering apertures in the end wall of the cylinder and in the diaphragm, an operating piston within said cylinder, another conduit leading from the valve chamber at a position beyond the valve seating and communicating with a brake, and a stop to limit the movement of the operating piston in its outward (retracted) movement whereby at the end of that movement it will move the cylinder away from the valve seating.

14. A fluid-pressure braking system having in combination a plurality of fluid-pressure brakes, a main pressure device, and individually operable auxiliary pressure devices for said brakes, each such auxiliary device comprising a valve chamber having in it a seating, a valve co-operating with said seating, a conduit connecting the main pressure device with said seating, a flexible diaphragm opposed to and spaced from said seating and having its outer margin in sealed engagement with the wall of the valve chamber, a cylinder which is movable towards and away from the valve seating and is secured to and movable with the diaphragm, registering apertures in the end wall of the cylinder and in the diaphragm, an operating piston within said cylinder, another conduit leading from the valve chamber at a position beyond the valve seating and communicating with a brake, a stop to limit the movement of the operating piston in its outward (retracted) movement whereby at the end of that movement it will move the cylinder away from the valve seating, and a lost-motion connection between the valve and the cylinder whereby movement of the latter by the outward movement of the operating piston will positively lift the valve from its seating.

15. A fluid-pressure braking system having in combination a plurality of fluid-pressure brakes, a main pressure device, and individually operable auxiliary pressure devices for said brakes, each such auxiliary device comprising a valve chamber having in it a seating, a valve co-operating with said seating, a conduit connecting the main pressure device with said seating, a flexible diaphragm opposed to and spaced from said seating and having its outer margin in sealed engagement with the wall of the valve chamber, a cylinder which is movable towards and away from the valve seating and is secured to and movable with the diaphragm, registering apertures in the end wall of the cylinder and in the diaphragm, an operating piston within said cylinder, another conduit leading from the valve chamber at a position beyond the valve seating and communicating with a brake, and a guide cylinder surrounding the said movable cylinder.

16. A fluid-pressure braking system having in combination a plurality of fluid-pressure brakes, a main pressure device, and individually operable auxiliary pressure devices for said brakes each such auxiliary device comprising a relatively fixed compartment containing a valve seating, a conduit connecting said compartment through the valve seating with the main pressure device, a piston member movable in said compartment and having a cylindrical extension in communication with the compartment, a valve carried by said piston member and co-operating with said valve seating, an operating piston movable in said cylindrical extension, another conduit connecting said compartment with an associated brake, and a guide cylinder surrounding the said cylindrical extension.

17. A fluid-pressure braking system having in combination a plurality of fluid-pressure brakes, a main pressure device, and individually operable auxiliary pressure devices for said brakes each such auxiliary device comprising a valve chamber having in it a valve seating, a conduit connecting said main pressure device with the valve seating, a flexible diaphragm opposed to and spaced from the valve seating and having its outer margin in sealed engagement with the wall of the valve chamber, a cylinder secured to and movable with the diaphragm towards and away from the valve seating, registering apertures in the end wall of the cylinder and in the diaphragm, a sleeve secured in said aperture, a valve which co-operates with the said seating, is slidingly guided in said sleeve and has a radial projection at its end remote from the valve seating to afford a lost-motion connection between it and the sleeve, an operating piston in said cylinder, and a conduit entering the valve chamber at a position beyond the valve seating and communicating with a brake.

18. A fluid-pressure braking system having in combination a plurality of fluid-pressure brakes, a main pressure device, and individually operable auxiliary pressure devices for said brakes each such auxiliary device comprising a valve chamber having in it a valve seating, a conduit connecting said main pressure device with the valve seating, a flexible diaphragm opposed to and spaced from the valve seating and having its outer margin in sealed engagement with the wall of the valve chamber, a cylinder secured to and movable with the diaphragm towards and away from the valve seating, registering apertures in the wall of the cylinder and in the diaphragm, a valve which co-operates with the said seating extends through the said registering apertures and has a radial projection at its end remote from the seating to afford a lost-motion connection between it and a margin of the registering apertures, an operating piston in said cylinder and a conduit entering the valve chamber at a position beyond the valve seating and communicating with the brake.

19. For a fluid-pressure braking system having a main pressure device, an auxiliary pressure device comprising in combination a valve chamber having a seating therein, a conduit leading to said seating for connection with the main pressure device, a flexible diaphragm opposed to and spaced from said seating, a cylinder secured to and movable with the diaphragm towards and away from the valve seating, registering apertures in the end wall of the cylinder and in the diaphragm, a valve guided in said aperture and co-operating with the valve seating, an operating piston in said cylinder, a stop to limit outward movement of the piston relatively to its cylinder, a lost-motion connection between the valve and a wall of the aperture in which it slides and a conduit leading into the valve chamber beyond the valve seating for connection with a brake.

20. For a fluid-pressure braking system having a main pressure device, an auxiliary pressure device comprising in combination a valve chamber having a seating therein, a conduit leading to said seating for connection with the main pressure device, a flexible annular diaphragm opposed to and spaced from said seating, a cylinder secured to and movable with the diaphragm towards and away from the valve seating, registering apertures in the end wall of the cylinder and in the diaphragm, a sleeve secured in said registering apertures, a hollow valve guided in said sleeve and co-operating with the valve seating, a radial flange on said valve to co-operate in conjunction with an end of the sleeve to afford a lost-motion connection between the valve and the sleeve, an operating piston in said cylinder, a stop to limit the outward movement of the piston relatively to its cylinder, and a conduit leading into the valve chamber beyond the valve seating for connection with a brake.

21. For a fluid-pressure braking system having a main pressure device, an auxiliary pressure device comprising in combination a valve chamber having a seating therein, a conduit leading to said seating for connection with the main pressure device, a flexible annular diaphragm opposed to and spaced from said seating, a cylinder secured to and movable with the diaphragm towards and away from the valve seating, registering apertures in the end wall of the cylinder and in the diaphragm, a sleeve secured in said registering apertures, a hollow valve guided in said sleeve and co-operating with the valve seating, a radial flange on said valve to co-operate in conjunction with an end of the sleeve to afford a lost-motion connection between the valve and the sleeve, an operating piston in said cylinder, a stop to limit the outward movement of the piston relatively to its cylinder, a conduit leading into the valve chamber beyond the valve seating for connection with a brake, and a relatively fixed guide cylinder surrounding the movable cylinder.

22. A fluid-pressure braking system having in combination a plurality of fluid-pressure brake sets, a main pressure device for supplying fluid under pressure to the brake sets simultaneously, and individually operable auxiliary pressure devices to supply pressure fluid each to its appropriate brake set, each such auxiliary device comprising a pressure-fluid chamber, a conduit connecting said chamber with a brake set, a conduit connecting said chamber with the main pressure device and a valve which controls the latter conduit and is normally open but is closed on actuation of the auxiliary pressure device.

23. A fluid-pressure braking system having in combination a plurality of fluid-pressure brake sets, a main pressure device for supplying fluid under pressure to the brake sets simultaneously, and individually operable auxiliary pressure devices for said brake sets, each such auxiliary device comprising a pressure-fluid chamber, a part movable from a retracted position to supply pressure fluid to the appropriate brake set, a conduit connecting said chamber with a brake set, a conduit connecting said chamber with the main pressure device, and a valve which controls the latter conduit and is operatively connected with a movable member to be positively opened thereby when the latter is in its retracted position.

24. For a fluid-pressure braking system having a main pressure device for supplying fluid under pressure to a plurality of brake sets simultaneously, an auxiliary pressure device for individual operation to supply pressure fluid to its appropriate brake set, comprising a pressure-fluid chamber, a conduit for connecting said chamber with a brake set, another conduit for connecting said chamber with the main pressure device and a valve which controls the latter conduit and is closed on actuation of the auxiliary pressure device, but is opened on release thereof to allow fluid to pass in either direction between the brake set and the main pressure supply.

In testimony whereof I affix my signature.

WILLIAM LEICESTER AVERY.